(12) United States Patent
Tajima et al.

(10) Patent No.: US 6,871,354 B2
(45) Date of Patent: Mar. 22, 2005

(54) DISC CARTRIDGE, OPTICAL DISK DEVICE, AND METHOD FOR INFORMATION RECORDING AND REPRODUCING

(75) Inventors: Hideharu Tajima, Tenri (JP); Nobuyuki Takamori, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 218 days.

(21) Appl. No.: 10/277,792

(22) Filed: Oct. 22, 2002

(65) Prior Publication Data

US 2003/0076776 A1 Apr. 24, 2003

(30) Foreign Application Priority Data

Oct. 23, 2001 (JP) ........................................ 2001-324459

(51) Int. Cl.[7] ............................................. G11B 23/03
(52) U.S. Cl. ........................ 720/738; 720/720; 360/133
(58) Field of Search ............................... 720/738–739, 720/720; 360/133; 369/291, 289

(56) References Cited

U.S. PATENT DOCUMENTS

| | | | | |
|---|---|---|---|---|
| 5,063,558 A | * | 11/1991 | Takahashi | 369/291 |
| 5,153,801 A | * | 10/1992 | Ikebe et al. | 360/133 |
| 5,422,775 A | * | 6/1995 | Martin | 360/133 |
| 5,537,389 A | * | 7/1996 | Kuwa et al. | 369/291 |
| 5,570,342 A | * | 10/1996 | Kosaka | 369/291 |
| 5,671,212 A | * | 9/1997 | Miyazaki et al. | 369/291 |
| 6,021,030 A | * | 2/2000 | Weinberger et al. | 360/133 |
| 6,356,527 B1 | * | 3/2002 | Shiomi et al. | 369/291 |
| 6,459,677 B1 | * | 10/2002 | Shiomi et al. | 720/739 |
| 6,741,537 B1 | * | 5/2004 | Sanada et al. | 369/77.2 |

FOREIGN PATENT DOCUMENTS

| | | | | |
|---|---|---|---|---|
| JP | 06-131841 | | 5/1994 | |
| JP | 2002056601 A | * | 2/2002 | ........... G11B/17/04 |

* cited by examiner

Primary Examiner—Brian E. Miller
(74) Attorney, Agent, or Firm—David G. Conlin; Steven M. Jensen; Edwards & Angell, LLP (57) ABSTRACT

A disk cartridge includes a case, substantially rectangular in shape, provided with a disk-shaped rotatable recording medium therein, the case including a plurality of windows through which the recording medium is exposed and a recording or reproducing head is inserted when recording or reproducing, and shutters provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window. With this arrangement, it is possible to provide a disk cartridge capable of adopting for both a driving device for a small-sized disk and a driving device for a large-sized disk.

20 Claims, 13 Drawing Sheets

DISC CARTRIDGE, OPTICAL DISK DEVICE, AND METHOD FOR INFORMATION RECORDING AND REPRODUCING

FIELD OF THE INVENTION

The present invention relates to a disc cartridge storing an optical medium for information recording and reproducing, an optical disk device for carrying out information recording and reproducing with respect to the disk cartridge, and a method for information recording and reproducing.

BACKGROUND OF THE INVENTION

Generally, a disk-shaped medium such as an optical disk or a magnetic disk is stored in a disk cartridge for dust control or convenient insertion to a recording/reproducing device. Such a disc cartridge has a window to accept insertion of a recording/reproducing head and a turntable for rotation driving of the disk. Further, the disk cartridge has a covering board to open and close the window, which is generally called a shutter. Various optical disks such as a mini disk (MD), a magneto-optical disk, or a DVD, or a flexible disk can be the recording medium having such an arrangement.

Figure 10:
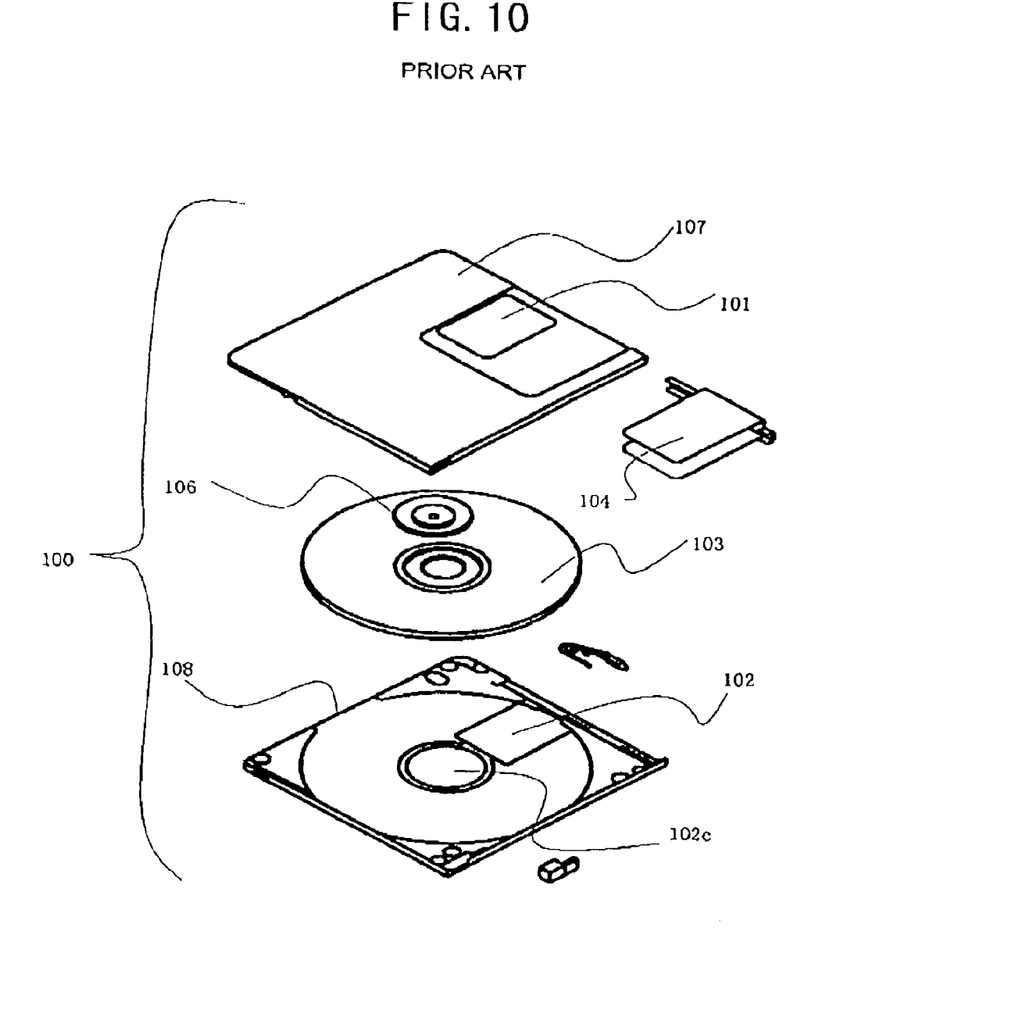
FIG. 10 is a diagrammatic view showing an example of component arrangement of a conventional disk cartridge.
Figures 11A, 11B, 11C:
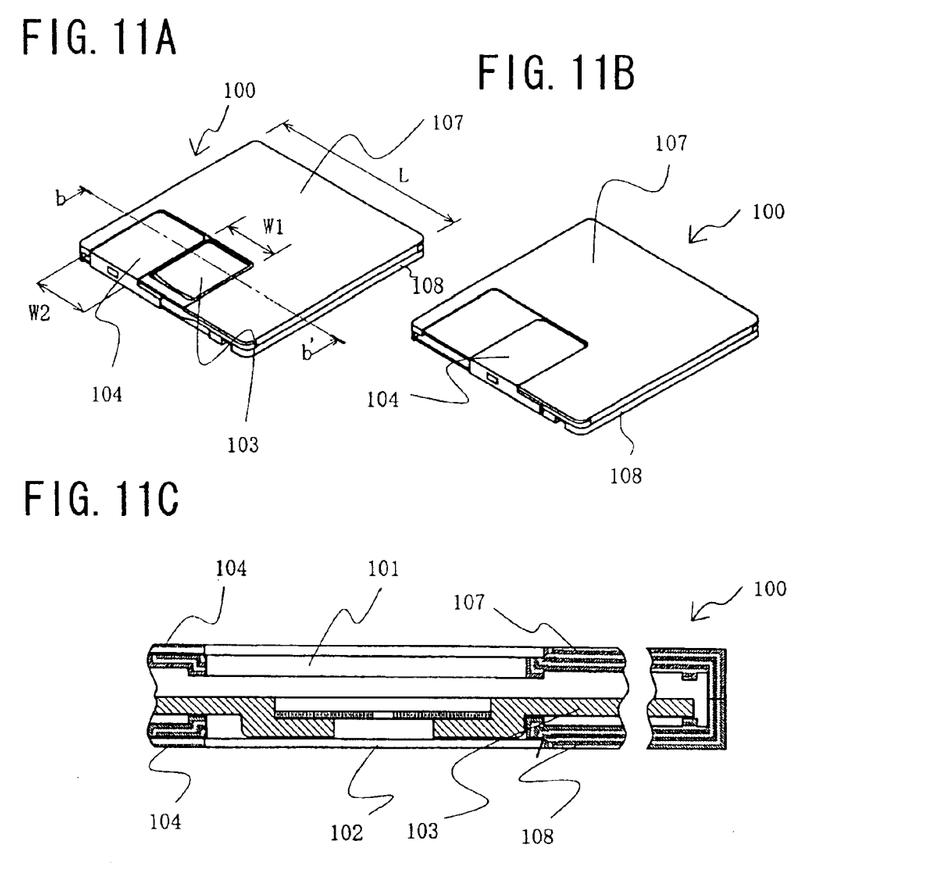
Figures 11D, 11E:
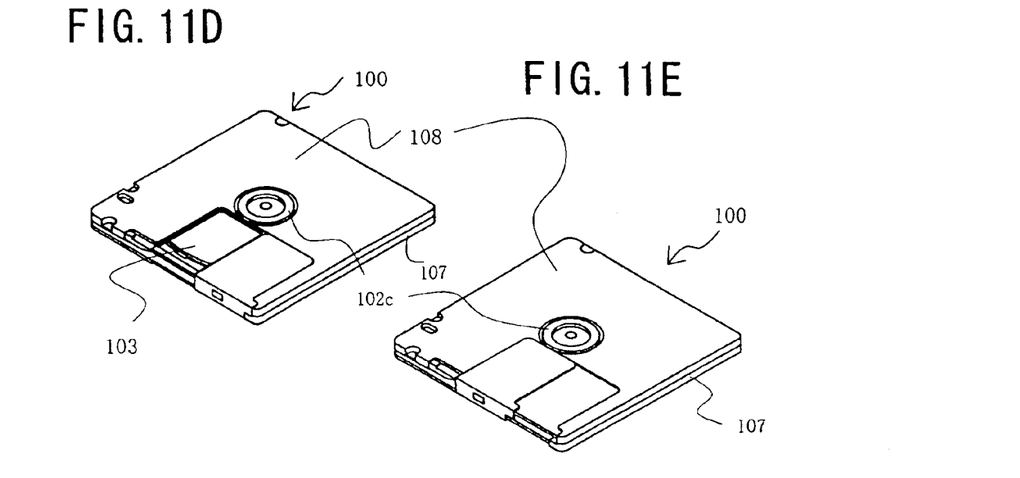
FIGS. 11D and 11E are perspective views showing the opened state and the closed state of the shutter in the rear surface of the disk cartridge shown in FIG. 10.
Figures 12A, 12B, 12C:
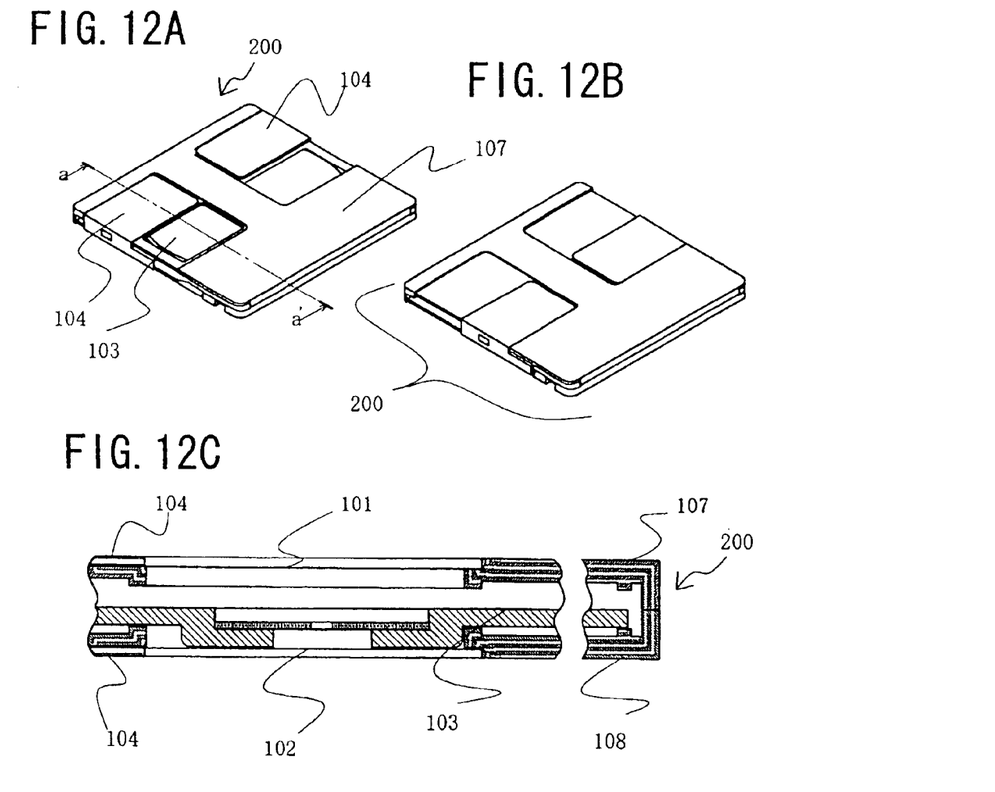
FIGS. 12A and 12B are perspective views showing the opened state and the closed state of the shutter in the front surface of another conventional disk cartridge.
FIG. 12C is a cross sectional view of the disk cartridge shown in FIGS. 12A and 12B.
Figures 12D, 12E:
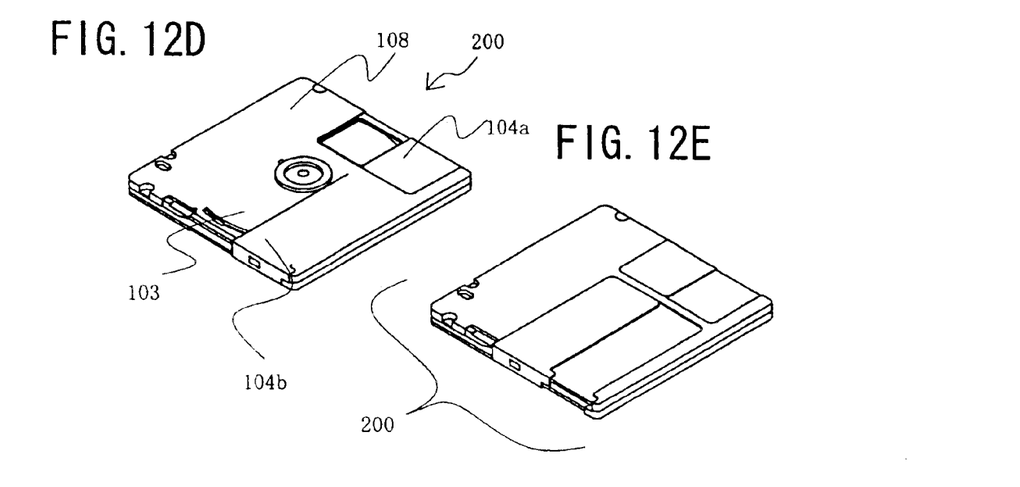
FIGS. 12D and 12E are perspective views showing the opened state and the closed state of the shutter in the rear surface of the disk cartridge shown in FIG. 12C.

As an example of the medium, FIG. 10 shows an arrangement of components included in a disk cartridge of an MD. Further, FIGS. 11A through 11E are schematic diagrams and a cross-sectional view showing the opened state and the closed state of the shutter of the disk cartridge. The disk cartridge 100 adopts a magnetic head and an optical head for recording/reproducing of the disk 103. As shown in FIGS. 11A through 11E, and FIGS. 12A through 12E, the disk cartridge 100 roughly includes a front case 107 and a rear case 108, and stores the disk 103. The front case 107 has an upper window 101 as an insertion hole for a magnetic head, and the rear case 108 has a turntable insertion hole 102c and a lower window 102 for insertion of an optical head. These two windows 101 and 102 can be opened and closed with a shutter 104, and is opened when recording/reproducing is carried out, and is closed when recording/reproducing is not carried out.

Further, when recording/reproducing is carried out, the disk 103 is joined to a turntable of an optical disk device with a magnet due to magnetic force through the lower window 102 via a clamping plate 106 of magnetic material included in the disk 103. The disk 103 joined to the turntable is rotated for driving, and also writing or reading of information signals is performed with the magnetic head or the optical head by making access to the information recording surface of the disk 103 via the upper window 101 and/or the lower window 102.

Note that, the arrangements of cartridges used for the other media stated above do not greatly differ from this cartridge except for the covering before the insertion to a turntable, and the covering method which either uses a shutter and a spring, or uses mechanical covering by a shutter lock.

Further, Japanese Unexamined Patent Publication Tokukaihei 6-131841 (published on May 13, 1994) discloses a disk cartridge having two windows (or may also be called insertion holes) having the same arrangement as above in one surface. In this disk cartridge, in the recording/reproducing, writing and reading of information signals is carried out via the two windows with a recording head and a reproducing head (such as an optical head or a magnetic head) which simultaneously make access to the same signal recording surface. FIGS. 12A through 12E are schematic diagrams and a cross-sectional view showing the opened state and the closed state of the shutter the disk cartridge 200.

Since the component arrangement of the disc cartridge 200 is not greatly differ from the described disc cartridge 100 of an MD, for ease of explanation, materials having the equivalent functions as those of the disk cartridge 100 will be given the same reference symbols, and explanation thereof will be omitted here. As shown in FIGS. 12A through 12E, the disk cartridge 200 has two windows in the same case made of the front case 107 and the rear case 108 for inserting a recording head and a reproducing head. The two windows slide to open in the same directions with the shutter 104. With this arrangement, the disk 103 stored in the disk cartridge 200 can be used for a disk device in which a recording head and reproducing head make access to the same surface at the same time.

Further, the publication above also suggests an example of the disk cartridge having respective shutter 104a and 104b, which are separately opened and closed. In this disk cartridge, when it is used for a disk driving device capable of accepting either of recording/reproducing head to the signal recording surface, the unused window for insertion is closed while the other is opened for accepting a recording/reproducing head to be accessed to the signal recording surface, thus ensuring a superior dust control.

The following will respectively describe two types of the driving device used for recording/reproducing the disk stored in the foregoing disk cartridge.

One is a large-sized driving device for a large disk (for example, a DVD player) capable of recording a large amount of information, and generally fixed in a predetermined place. Another is a small-sized driving device for a small disk (for example, a portable MD player) capable of movable use. These driving devices have different priorities in the performance depending on the purpose of use. For example, a small sized driving device has to be downsized for meeting its purpose of movable use.

Accordingly, in the small sized driving device, the shutter provided in the disk cartridge should not go out of the width of the disk cartridge even in the opened state. The following will discuss the condition of the shutter which does not go out of the width of the disk cartridge even in the opened state with reference to FIG. 11A through 11E, and FIGS. 13A and 13B.

Figure 13A:
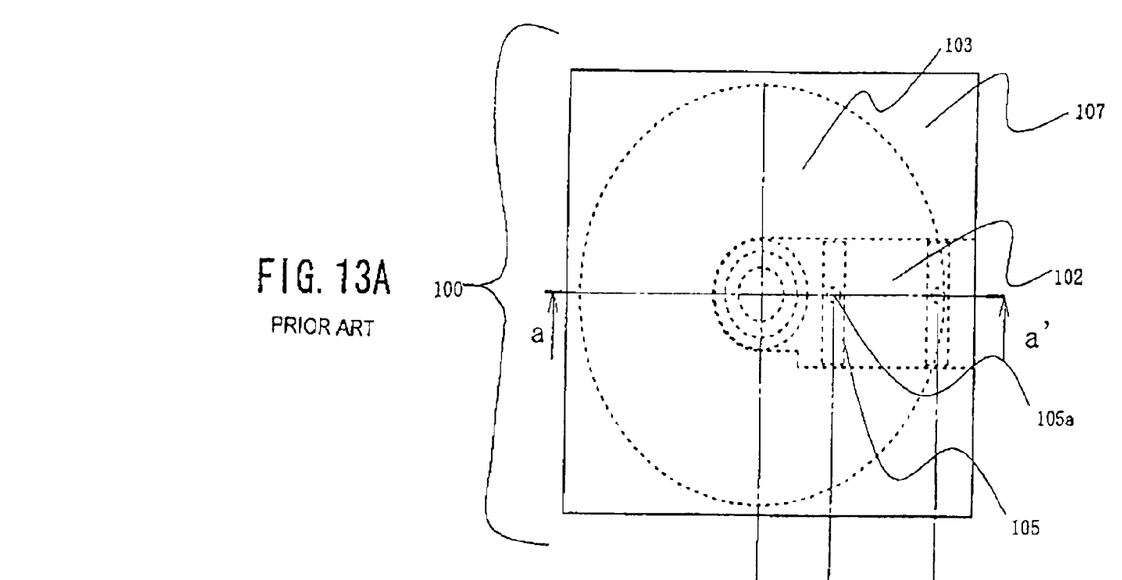
FIG. 13A is a projection view showing the disk cartridge shown in FIGS. 11A through 11E in a recording/reproducing state by being placed in an exclusive optical disk device.
Figure 13B:
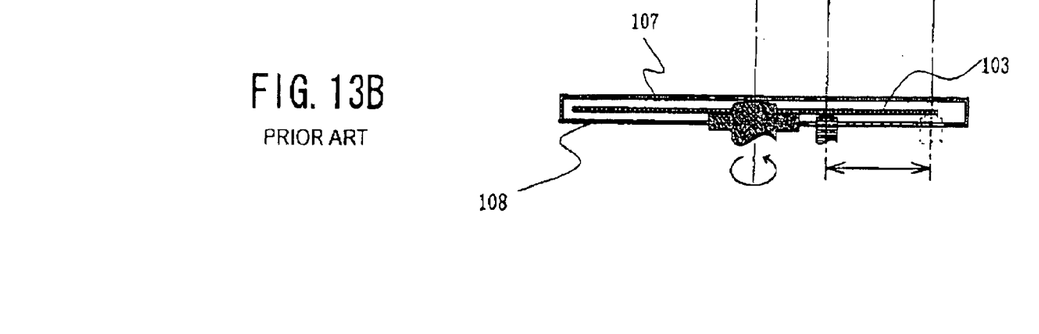
FIG. 13B is a cross sectional view, taken along the line a–a' of FIG. 13A.

In the cartridge 100 shown in FIGS. 11A through 11E used for such as an MD, a lens center 105a of an optical head 105 is moved on a line a–a' (a line on the center of the turntable) to carry out recording/reproducing of an optical disk. When the lens center 105a goes out of the line a–a', the existing optical disk device becomes incapable of position recognition for recording/reproducing. For this reason, as shown in FIGS. 13A and 13B, the disk cartridge 100 has the lower window 102 (insertion hole for the optical head) substantially symmetrical with respect to the centerline (a line a–a'). In this disk cartridge 100, the width of the window W1 is substantially the same as the width of the shutter W2 (note: W1=W2=W) and the lower window has to be the center of the cartridge as thus described in order to meet the requirement of the condition of the shutter 104 which does not go out of the width of the disk cartridge, and therefore the condition is denoted by the following equation;

$$\tfrac{1}{2}L \geq \tfrac{1}{2}W + W$$

where L represents the length of opening/closing direction (sliding direction) of the shutter 104.

More specifically, the limitation of the width of the window is about ⅓ of the length L of the cartridge, and also it is ⅓ of the diameter of the disk since it is preferable that the length of the cartridge is substantially the same as the diameter of the disk so as to downsize the disk.

Meanwhile, a major demand for the large-sized driving device used for a large capacity recording medium is high speed information processing for dealing with a large amount of information. Thus, respective driving devices corresponding each diameter have been provided as the large sized driving device. The respective driving devices use optical heads (recording/reproducing head) corresponding to the diameter of the disk so as to realize high speed, high density and stable information processing. Further, for thus realizing high speed, high density and stable information processing, the beam diameter required for the recording/reproducing have to be reduced by bringing the objective lens of the optical head as close as possible to the disk so that the focal distance is reduced. The beam diameter needs to be large to some extent before passing through the objective lens so as to effectively reduce the beam diameter, since it is difficult to adjust the focus of the beam in excessively small diameter. In the small sized driving device whose major demand is downsizing has the limitation of the width of the window in the disk cartridge, and therefore it is impossible to make a large beam diameter. Consequently, high speed information processing is difficult in a small-sized driving device.

Incidentally, in recent years, there has been a new demand of high speed information processing by using a large sized driving device with respect to information recorded on a small disk with a portable small-sized driving device.

To use a small disk in a large-sized driving device, which is normally used for a large disk, the recording/reproducing head in the large-sized driving device needs to be fit to the window (insertion hole for a recording/reproducing head) of the small sized driving device. However, a conventional small disk such as an MD has a window in a width of ⅓ of the width of the disk cartridge. Therefore, when a large-sized driving device is used for the small disk having the small window, as has been described, the particular function of a large-sized driving device, i.e., high speed information processing cannot be expected.

Further, the cartridge 200 disclosed in Japanese Unexamined Patent Publication Tokukaihei 6-131841 does not meet the foregoing requirement either due to the reason above (limitation of the size of the window), though it is adoptable for various recording heads or reproducing heads by having a plurality of windows (insertion hole for recording/reproducing head).

SUMMARY OF THE INVENTION

The present invention is made in view of the foregoing conventional problems, and an object is to provide a disk cartridge can be used for both a small-sized driving device and a large-sized driving device while maintaining the usefulness of these devices, and further, to provide an optical disk device which carries out recording or reproducing of information by using the disk cartridge, and a method for recording and reproducing information with the disk cartridge.

A disk cartridge of the present invention includes a case, substantially rectangular in shape, provided with a disk-shaped rotatable recording medium therein, the case including a plurality of windows through which the recording medium is exposed and a recording or reproducing head is inserted when recording or reproducing, and shutters provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window.

The disk cartridge stores therein a recording medium such as an optical disk. When the disk cartridge is set in a driving device such as an optical disk device, a recording head of the driving device records information on the optical disk, or a reproducing head of the driving device reads out information from the optical disk. The disk cartridge includes a case having two windows (first and second windows) at least one surface facing a disk-shaped surface of the optical disk. The windows are provided for allowing the optical disk to be exposed to the recording head or the reproducing head when recording or reproducing, and are provided on one surface. Further, the case includes the shutter for opening and closing the windows. In the disk cartridge, the first window is wider in width in the opening and closing direction of the shutters than the second window.

With the foregoing arrangement, it is possible to allow a small disk (recording medium), which is normally used with a small-sized driving device, to make access to the recording or reproducing head of a large-sized driving device through the window in a larger width. On this account, the disk cartridge may be used in such a manner that information is recorded with a small-sized driving device and reproduced with a large-sized driving device capable of high speed information processing, thus improving compatibility between the small-sized driving device and the large-sized driving device.

A method for information recording and reproducing of the present invention is a method for information recording and reproducing with respect to a disk cartridge which includes a case, substantially rectangular in shape, provided with a disk-shaped rotatable recording medium therein, the case including a plurality of windows through which the recording medium is exposed and a recording or reproducing head is inserted when recording or reproducing, and shutters provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window, the method includes the steps of:

recording information by inserting a small-sized optical head of a portable optical disk device through the second window; and reproducing information by inserting a large-sized optical head of a stationary optical disk device through the first window.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 1E through 1G are perspective views of the disk cartridge.

FIGS. 11A and 1B are perspective views showing the opened state and the closed state of the shutter in the front surface of the disk cartridge shown in FIG. 10. FIG. 11C is a cross sectional view of the disk cartridge shown in FIGS. 11A and 11B.

DESCRIPTION OF THE EMBODIMENTS

The following will explain one embodiment of the present invention with reference to FIGS. 1A through 9.

Figure 1A:
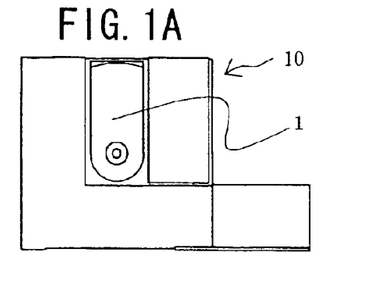
FIGS. 1A through 1G are diagrammatic views showing a disk cartridge according to an embodiment of the present invention. Note that, FIGS. 1A through 1D are front views of the disk cartridge.
Figure 1B:
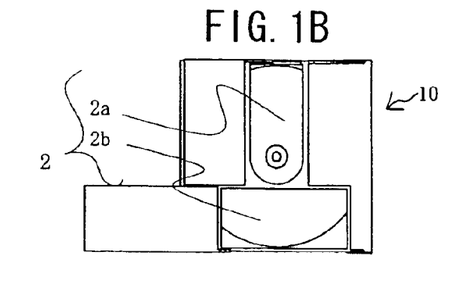
Figure 1C:
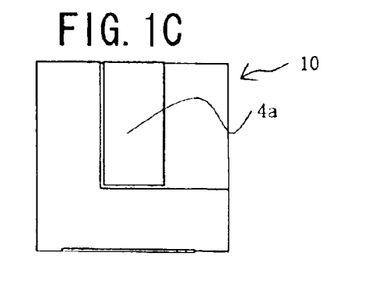
Figure 1D:
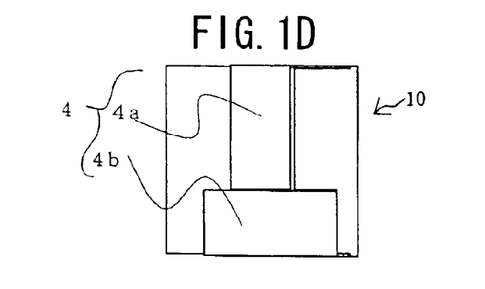
Figure 1E:
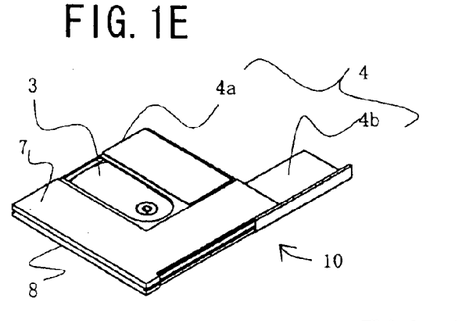
Figure 1F:
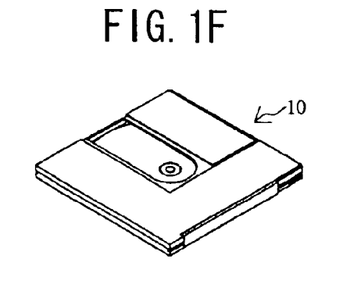
Figure 1G:
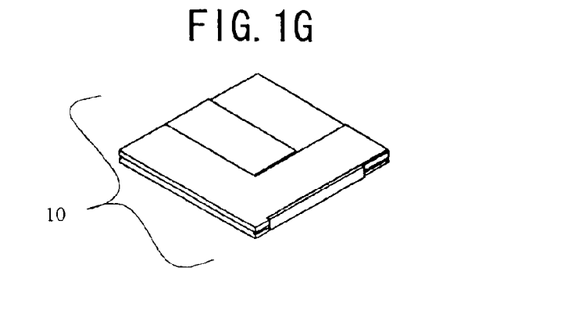

The present embodiment describes a disk cartridge for storing an optical disk capable of information recording/reproducing. FIGS. 1A through 1G are drawings showing a disk cartridge 10 according to the present embodiment. FIGS. 1A and 1B are front views showing the opened state of the shutter of the disk cartridge 10, and FIGS. 1C and 1D are front views showing the closed state of the shutter of the disk cartridge 10. Note that, FIGS. 1A and 1C are upper views of the disk cartridge 10, and FIGS. 1B and 1D are bottom views of the disk cartridge 10. Further, FIG. 1E is a perspective view showing a state where the two windows 2a and 2b are both opened, and FIG. 1F is a perspective view showing a state where only the opening 2a is opened, and FIG. 1G is a perspective view showing a state where the two windows 2a and 2b are both closed.

Figure 2:
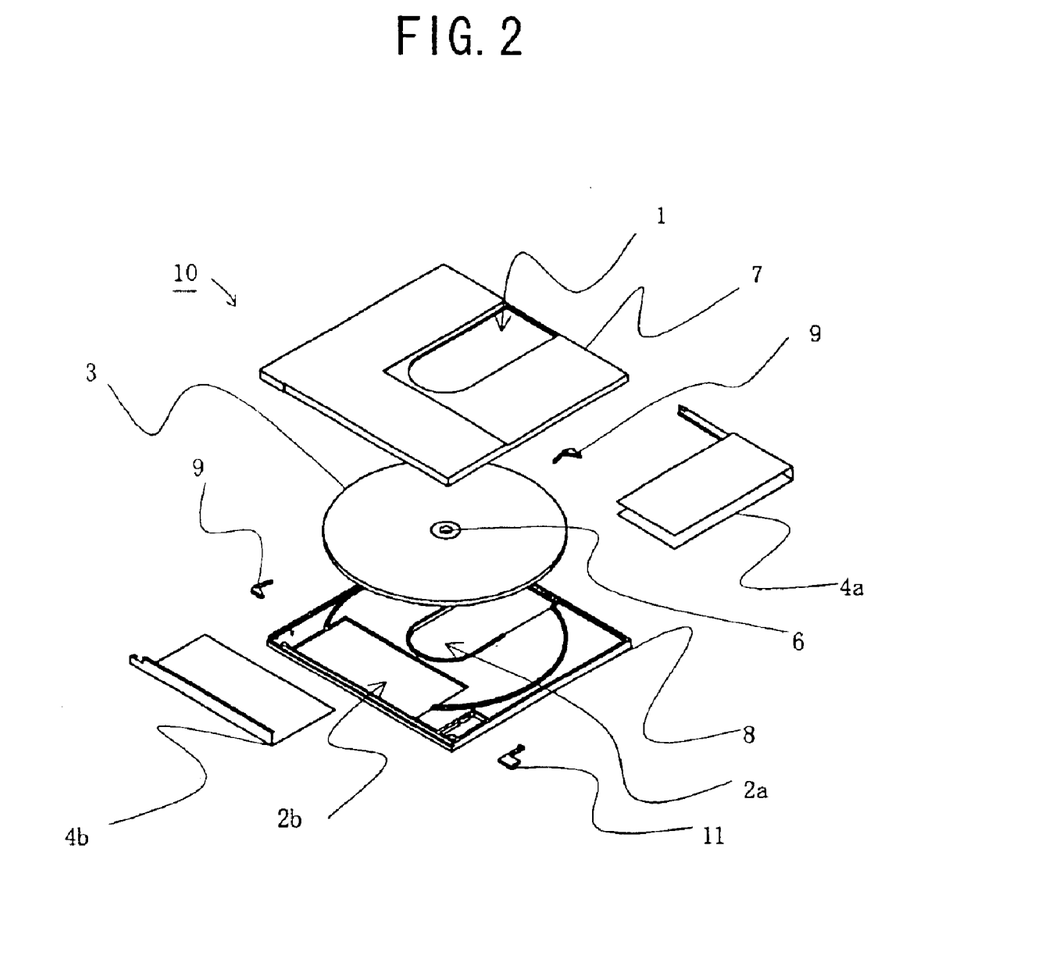
FIG. 2 is a diagrammatic view showing components of the disk cartridge shown in FIGS. 1A through 1G.

FIG. 2 is a diagrammatic view showing each component included in the disk cartridge 10 shown in FIGS. 1A through 1G. As shown in the figure, the disk cartridge 10 roughly includes an upper half case 7(case), a lower half case 8(case), an optical disk 3 (recording medium), a first shutter 4a (covering board), a second shutter 4b (covering board). The upper half case 7 has an upper window 1 (a third window). Further, the lower half case 8 has two lower windows 2a and 2b (window). The first shutter 4a which opens and closes the upper window 1 and lower window 2a is provided with a shutter rock 9. Further, the second shutter 4b which opens and closes the lower window 2b is provided with shutter locks 9 and 11. Further, a hub 6 made of magnetic material is placed in the center of the optical disk 3.

For example, in the case of an MD, the disk cartridge 10 constituted of the foregoing components has a size for storing a disk with the diameter ($\Phi$) of 64 mm. The disk cartridge 10 is used as a recording medium for an optical disk device which records, for example, an image information signal, on a recording track concentrically formed on a signal recording surface of the optical disk 3 and also reproduces the recorded information signal.

The optical disk 3 stored in the disk cartridge 10 is rotatable. The upper window 1 of the upper half case 7 is a window for inserting a turntable. Further, the lower window 2a of the lower half case 8 is an opening (including an insertion hole for a turntable) for inserting a small-sized optical head, and the lower window 2b of the lower half case 8 is an opening for inserting large-sized optical head. Further, the first shutter 4a is a shutter for opening and closing the upper window 1 and the lower window 2a. The shutter 4b is a shutter for opening and closing the lower window 2b. Note that, the width of the opening/closing direction of the upper window 1 and the lower window 2a is not more than ⅓ of the diameter of the optical disk 3 as with a conventional disk cartridge. On the other hand, the width of the opening/closing direction of the lower window 2b is not less than ⅓ of the diameter of the optical disk 3.

Figure 3:
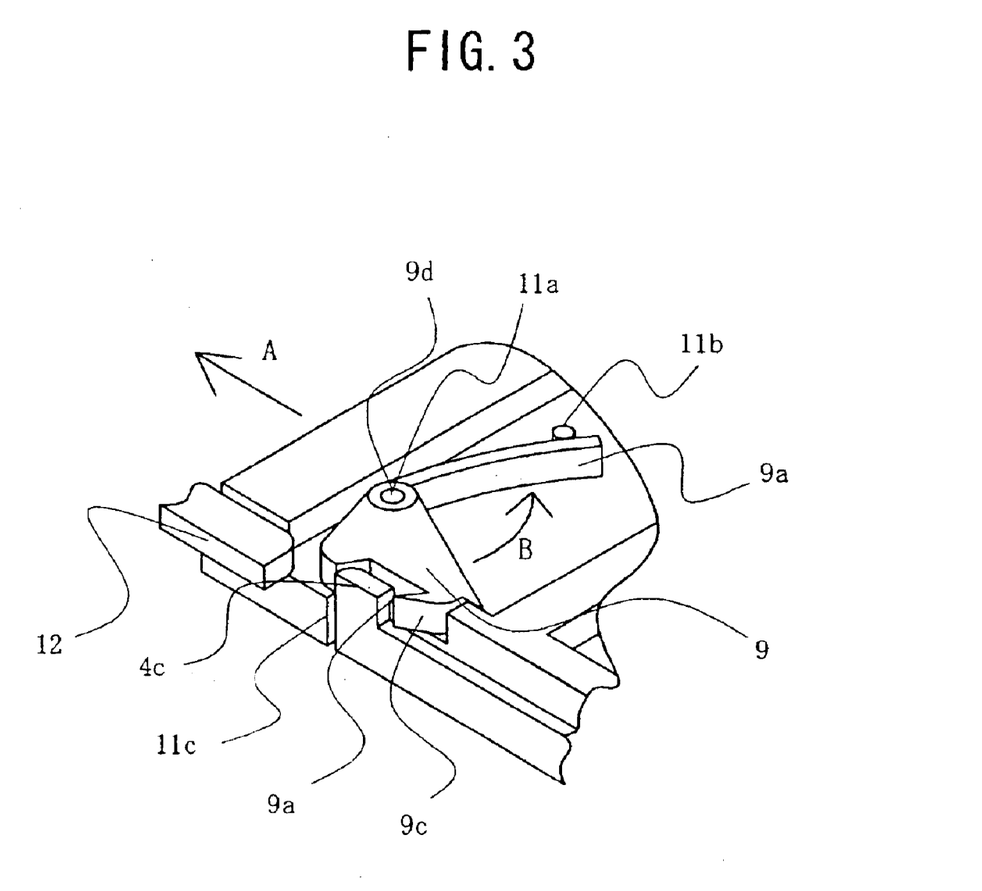
FIG. 3 is a diagrammatic view showing the vicinity of a portion of the disk cartridge shown in FIGS. 1A through 1G where the second shutter is provided.
Figure 4:
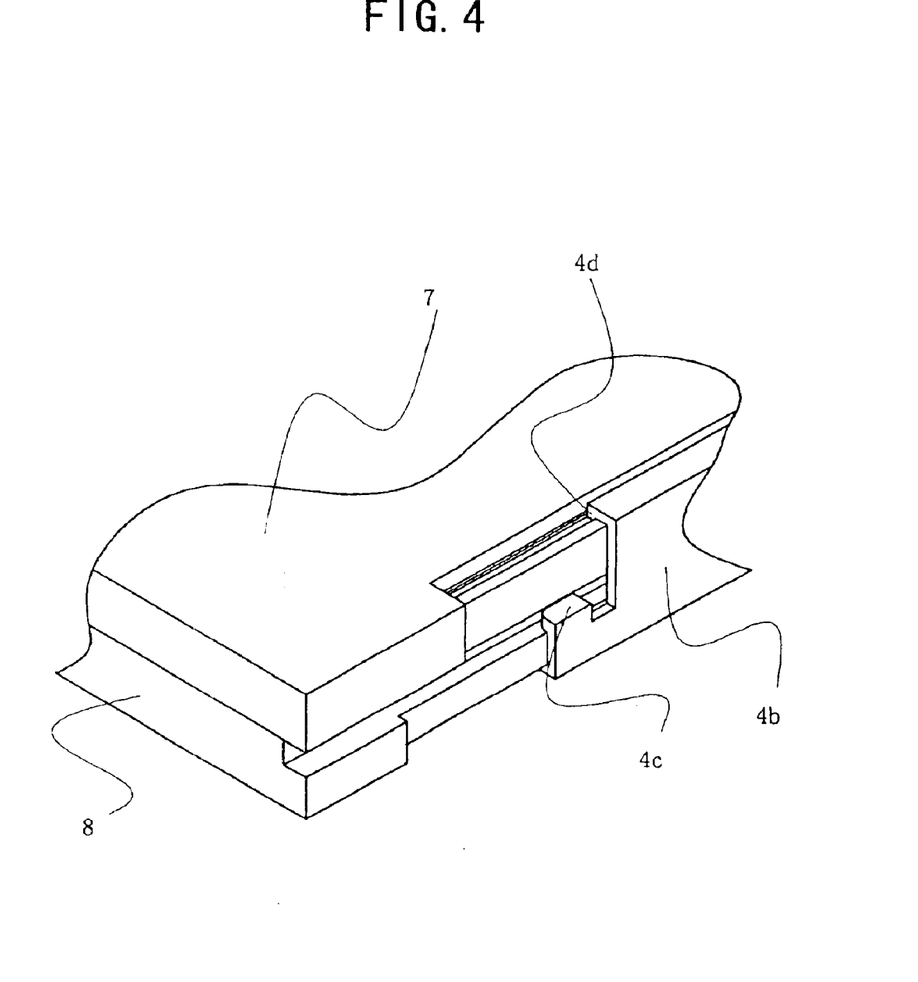
FIG. 4 is a schematic view showing the vicinity of the portion of the disk cartridge shown in FIGS. 1A through 1G where the second shutter is provided.

The following will explain the portions of the disk cartridge 10 where the first and second shutters 4a and 4b are provided. FIGS. 3 and 4 are diagrammatic views showing the vicinity of the portion of the disk cartridge 10 where the second shutter is provided. In the second shutter 4b, a cartridge engaging section 4d is fitted in a groove on a rail provided on a surface of the upper half case 7 of the disk cartridge 10 so as to allow the second shutter 4b to be free for opening and closing and to be firmly attached to the cartridge. Further, the shutter lock 9 is provided for the second shutter to keep it shut in a general state (when not performing recording/reproducing). A hole section 9d of the shutter lock 9 is fitted in a projection section 11a in a circular state provided on the rear surface of the lower half case 8 so that the shutter lock 9 is rotatable.

Then, to maintain the close shutter state of the shutter lock 9, an elastic section 9a is elastically deformed by a projection section 11b in a circular state provided on the rear surface of the lower half case 8. Further, when the second shutter 4b is closed, a shutter lock engaging section 4c provided on the edge of the second shutter 4b is fixed by being caught between a projection section 9c of the shutter lock and a projection section 11c of the lower half case 8.

Next, the following will explain when the second shutter 4b is opened. When the disk cartridge 10 is inserted in the direction A in FIG. 3 (when the disk cartridge 10 is inserted in an optical disk device such as a disk drive), the shutter lock 9 partly touches with a shutter opener 12 fixed in the device. Then, the shutter opener 12 rotates the shutter lock 9 in the direction B. As a result, the shutter lock engaging section 4c provided on the edge of the second shutter 4b is released from the projection section 9c so that the second shutter 4b is opened. Note that, the first shutter 4a has the same arrangement as that of the shutter 4b, thus performing opening/closing of the shutter in the same manner. Further, this arrangement of the shutter is an example of the present invention, and the present invention is not limited to this arrangement. The other means for opening and closing the shutter may be a biasing means with a spring or the like.

The disk cartridge 10 having the foregoing arrangement is capable of performing information recording/reproducing by using an optical disk device with exclusive light for each diameter of the disk. Here, the optical disk device with exclusive light mainly refers to a portable optical disk device exclusively designed for a small disk.

Figure 5A:
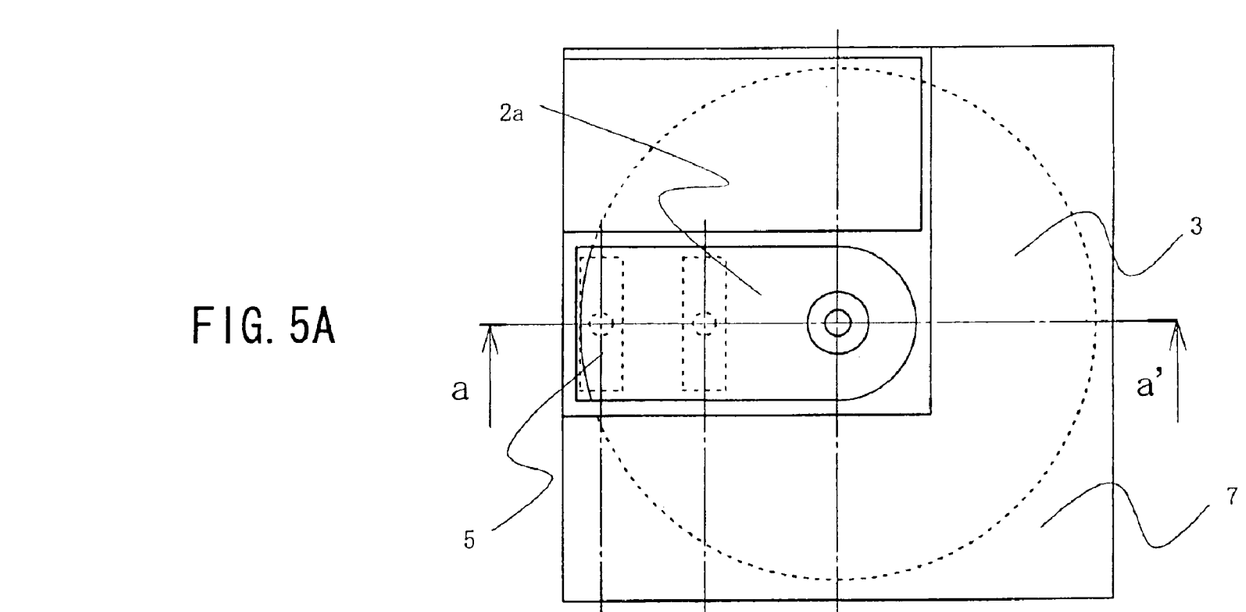
FIG. 5A is a projection view showing the disk cartridge shown in FIGS. 1A through 1G in a recording/reproducing state by being placed in an exclusive optical disk device.
Figure 5B:
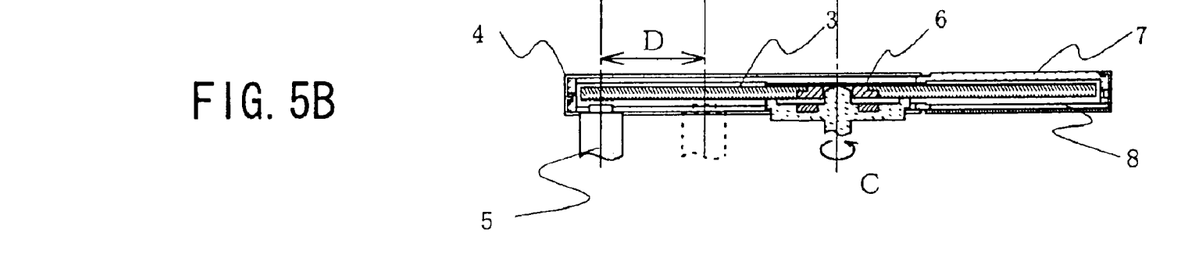
FIG. 5B is a cross sectional view, taken along the line a–a' of FIG. 5.

FIGS. 5A and 5B shows a recording/reproducing state of the disk cartridge 10 placed in the optical disk device with exclusive light. Note that, FIG. 5A is a projection view showing the arrangement of each components of the disk cartridge 10 seen through the upper half case 7. FIG. 5B is a cross-sectional view, taken along the line a–a' of FIG. 5A.

As shown in FIGS. 5A and 5B, when the optical disk 3 is recorded/reproduced, the hub 6 made of magnetic material connected to the optical disk 3 via the lower window 2a is joined to a turntable 201 including a magnet. Then, the optical disk 3 is rotated for driving in the direction indicated by the arrow C, and the optical head 5 making access to the signal recording surface of the optical disk 3 via the lower window 2b (insertion hole for an optical head) carries out recording/reproducing of information signal with respect to the optical disk 3 by moving within a range shown by the arrow D.

Next, the following will explain a recording/reproducing method of the disk cartridge 10 having the foregoing arrangement by using an optical disk device for a large disk ($\Phi$=120 mm), i.e., a stationary optical disk device. When the disk cartridge 10 is recorded/reproduced by using a stationary optical disk device, it is preferable that a cartridge adapter is used for placing the disk cartridge in an appropriate position. The disk cartridge is placed in the cartridge adapter and is connected to the optical disk device so as to carry out recording/reproducing the optical disk.

The present embodiment explains a cartridge adapter 20 shown in FIG. 6 and FIGS. 7A through 7C as an example of the cartridge adapter above. FIG. 6 and FIGS. 7A through 7C show a recording/reproducing state of the disk cartridge 10 ($\Phi$=50 mm) placed in the cartridge adapter 20, as with FIGS. 5A and 5B.

Figure 6:
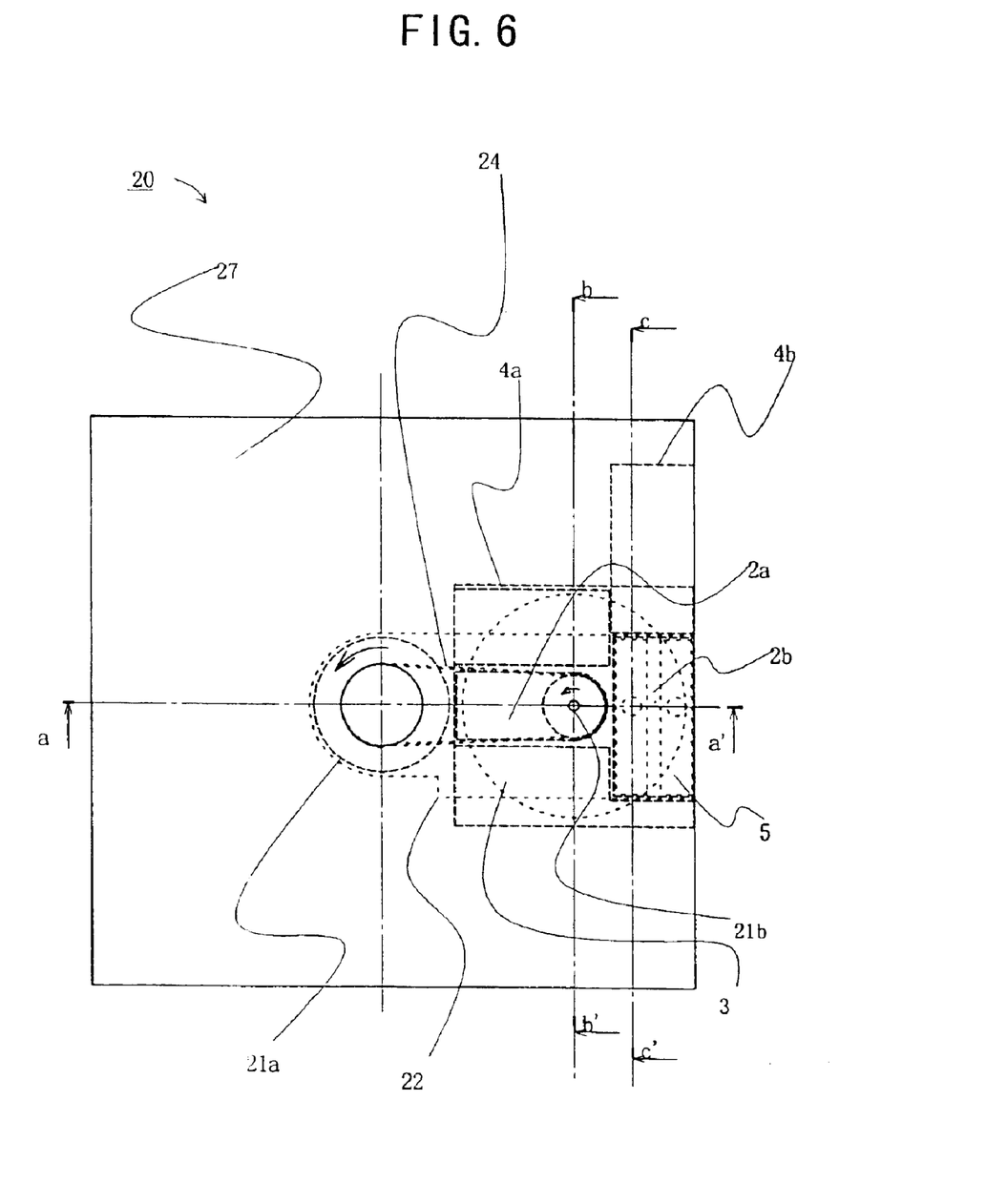
FIG. 6 is a projection view showing the disk cartridge shown in FIGS. 1A through 1G in a recording/reproducing state by being placed in a stationary optical disk device.
Figure 7A:
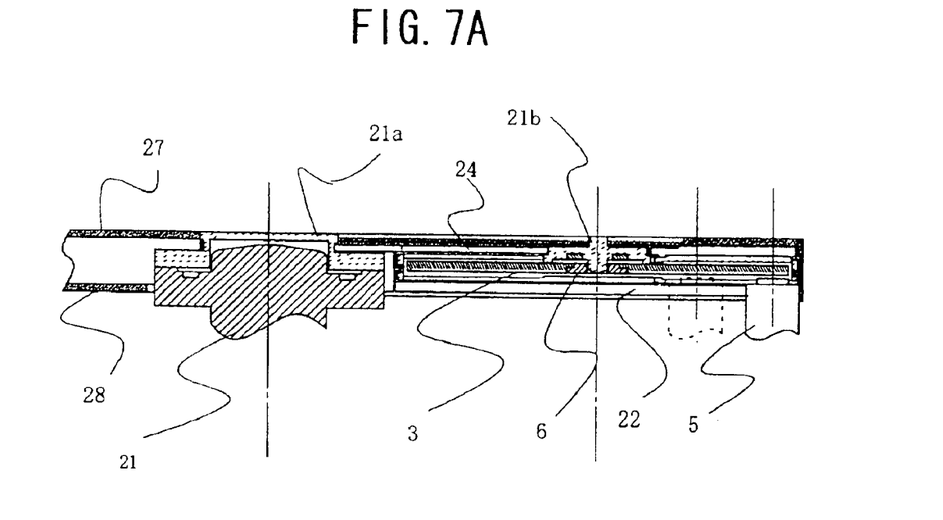
FIG. 7A is a cross sectional view, taken along the line a–a' of FIG. 6.
Figure 7B:
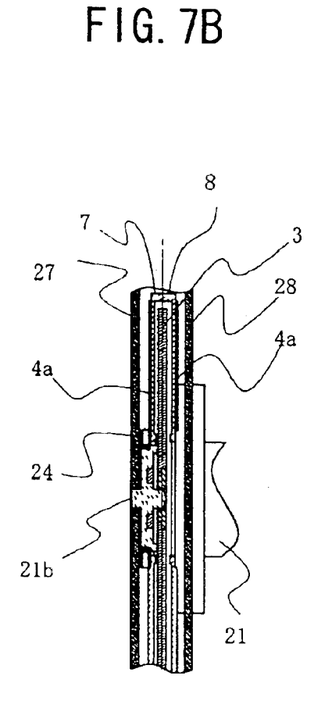
FIG. 7B is a cross sectional view, taken along the line b–b' of FIG. 6.
Figure 7C:
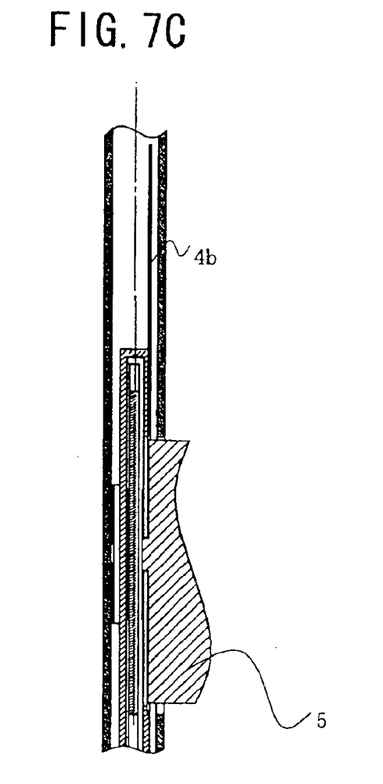
FIG. 7C is a cross sectional view, taken along the line c–c' of FIG. 6.

Note that, FIG. 6 is a projection view showing the arrangement of each components of the disk cartridge 10 seen through the upper half case 7. FIG. 7A is a cross-sectional view, taken along the line a–a' of FIG. 6, FIG. 7B is a cross-sectional view, taken along the line b–b' of FIG. 6, FIG. 7C is a cross-sectional view, taken along the line c–c' of FIG. 6.

As shown in FIG. 6 and FIGS. 7A through 7C, a turntable 21a (magnetic material) provided rotatable on the upper case 27 is joined to a turntable 21 (including magnet) of the driving device due to magnetic force via a window 22 provided on a lower case 28 of the cartridge adapter 20. A driving belt 24 is connected to the turntable 21a so as to transmit driving force to a turntable 21b (used for a disk of $\Phi$=50 mm) provided rotatable on the upper case 27 of the cartridge adapter 20. Since the disk 3 (small disk of $\Phi$=50 mm) has the hub 6 of magnetic material, the disk 3 is joined to a turntable 21b (including magnet) via the lower window 2a of the disk 3 so as to be rotated for driving. The optical head 5 making access to the signal recording surface of the optical disk 3 via the lower window 2b (insertion hole for a large-sized optical head) and the adapter window 22 carries out recording/reproducing of information signal with respect to the optical disk 3 by moving back and forth. Note that, it is possible to insert a large-sized optical head of an exclusive driving device for a large diameter disk in the lower window 2b since the opening/closing width of the second shutter 4b is at or wider than 1/3 of the diameter of the optical disk 3. On this account, high speed information processing by using an exclusive driving device for a large diameter disk can be carried out with respect to the disk cartridge 10.

Figure 8:
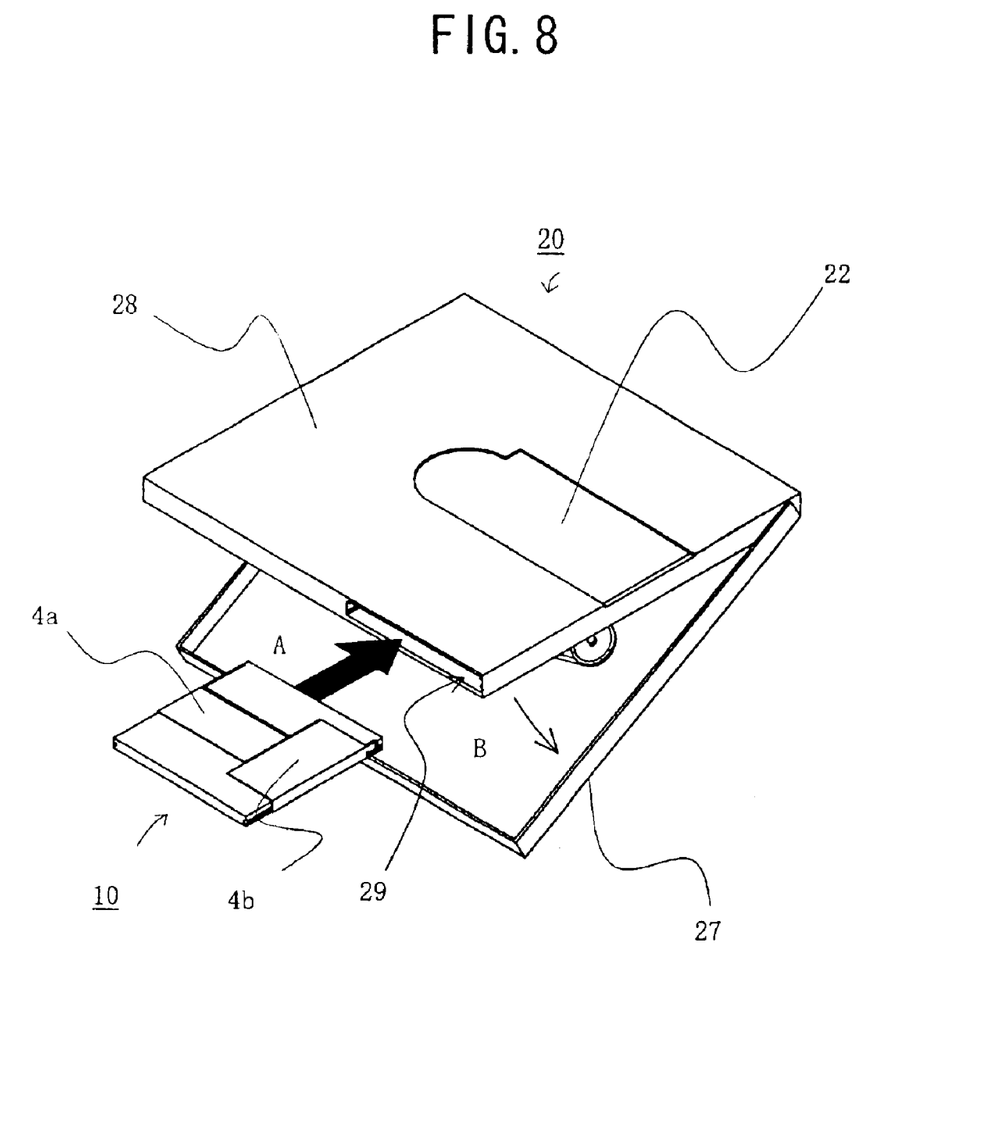
FIG. 8 is a diagrammatic view showing the disk cartridge shown in FIGS. 1A through 1G in a state of placing in a cartridge adapter of the stationary optical disk device.
Figure 9:
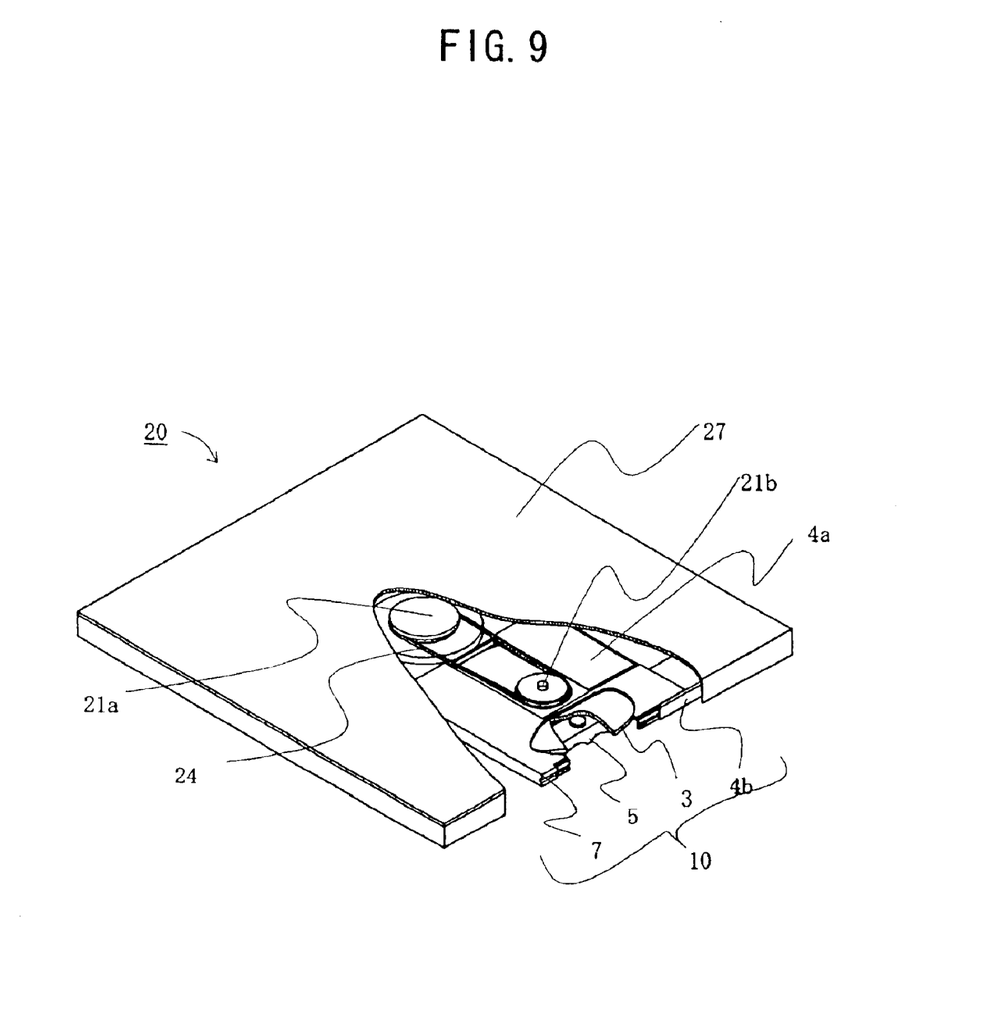
FIG. 9 is a diagrammatic view showing the inside of the cartridge adapter of the stationary optical disk device.

FIG. 8 shows a state where the disk cartridge 10 of the present invention is inserted in the cartridge adapter 20. Further, FIG. 9 is a schematic diagram showing an internal structure of the cartridge adapter having the same shape as that of a large-sized disk cartridge. Note that, FIG. 8 shows the cartridge adapter 20 with the lower case 28 facing up, and FIG. 9 shows the cartridge adapter 20 with the upper case 27 facing up. The following will explain the mechanism and the function with reference to those figures.

In the cartridge adapter 20, the upper case 27 and the lower case 28 are joined together to be capable of opening and closing by having a common side as a supporting point. Further, in the lower case 28, a window 22 which accepts an optical head for recording/reproducing is provided, and also, a slit section 29 is provided for inserting a small disk cartridge ($\Phi$=50 mm).

Further, the upper case 27 of the cartridge adapter 20 includes a first turntable for engaging in a large-sized disk driving system of the optical disk device, and a second turntable for engaging in a small-sized disk. These turntables transmit motive energy from the driving system via a driving belt.

Next, the following will explain an insertion operation of the disk cartridge 10 with a small diameter to the cartridge adapter 20. The disk cartridge 10 ($\Phi$=50 mm) is inserted in the slit section 29 in the lower case 28 of the cartridge adapter 20 in the direction A of FIG. 8 which is indicated by an arrow. Here, the first and second shutters 4a and 4b are opened by a shutter opener provided on the lower case 28 of the cartridge adapter 20. Further, the second shutter 4b goes out of the outline of the disk cartridge 19 of ($\Phi$=50 mm; however, fits in the cartridge adapter 20.

Next, the lower case 28 is moved in the direction B to be joined to the upper case 27. Here, the adapter 20 is the same as a general disk cartridge of $\Phi$=120 mm in its outer dimension and the window, and the window also has a shutter (not shown) which opens at the time of insertion to the optical disk device.

With this arrangement, it is possible to prevent dust from getting in the disk 3 in the disk cartridge 10 with a small diameter even when the disk cartridge 10 is opened. Further, by using this cartridge adapter, the structure of the optical disk device may be simplified.

Further, in the disk cartridge 10 with a small diameter, it is preferable that the first shutter 4a and the second shutter 4b have the same opening/closing direction.

With this arrangement, the first and second shutters 4a and 4b can be opened at the same time in response to the insertion operation of the disk cartridge 10 into the slit section 29 shown in FIG. 8, thus simplifying the structure of the cartridge adapter.

As described, the disk cartridge 10 according to the present embodiment can be used with an exclusive driving device for a small disk which is used as a portable device or the like, and an exclusive driving device for large disk capable of faster information processing. Further, the present embodiment shows an example such that a cartridge adapter is used for carrying out recording/reproducing with an exclusive driving device for large disk; however, the present invention is not limited to this arrangement. As another example, the same structure as that of the foregoing cartridge adapter may be provided as a structure of an optical device. The optical device having this structure is also included in the present invention.

The present embodiment explains a disk cartridge having an optical disk which uses only an optical head for carrying out recording/reproducing; however, the disk cartridge of the present invention may include a disk using both an optical head and a magnetic head such as a magneto-optical disk. In this arrangement, a window similar to the lower window 2b is provided, and the second shutter 4b is placed for covering the surface of the upper half case 7 as with the first shutter 4a.

However, the arrangement described in the present embodiment can sufficiently realize the object of the present invention, which is to process information recorded with a driving device for a small disk convenient for a portable use by a driving device for a large disk capable of high speed processing. This is because, in this case, recording to a small disk is not necessary, and therefore a magnetic head is not used, as it is required only for recording.

Further, it is preferable that the disk cartridge is as thin as possible so as to contribute further downsizing of a small-sized driving device. Note that, in the case of using polycarbonate for the upper and lower half cases 7 and 8 of the disk cartridge, to increase the strength of this thin material, it is preferable that only the lower window 2b is provided on the upper half case 7.

A disk-shaped recording medium used for the disk cartridge of the present invention may be a disk-shaped optical information recording medium such as a CD (Compact Disk), a CD-ROM (Compact Disk-Read Only Memory), a CD-R (Compact Disk-Recordable), a CD-RW (Compact Disk ReWritable), a DVD, a DVD-ROM, a DVD-R, a DVD-RV, an MD (Mini Disk); however the present invention is not limited to these media.

In the disk cartridge of the present invention, the width of the first window in the opening and closing direction of the shutters may be not less than ⅓ of a diameter of the recording medium.

In the disk cartridge of the present invention, the width of the second window in the opening and closing direction of the shutters may be less than ⅓ of the diameter of the recording medium.

In the disk cartridge of the present invention, the first window may allow insertion of a large-sized head of a first optical disk device, and the second window may allow insertion of a small-sized head of a second optical disk device.

In the disk cartridge of the present invention, when the first and second windows are opened, the covering board provided on the first window partially extends out of a width of the case, and the covering board provided on the second window is within the width of the case.

With this arrangement, when the disk cartridge is used with a small-sized driving device, it is possible to allow insertion of a recording or reproducing head of the driving device by opening only the second window whose covering section is within the case, thus further downsizing the small-sized driving device.

The disk cartridge of the present invention may be arranged such that the case has a third window on an opposite surface of the surface having the first and second windows, and the third window is formed on an area corresponding to the second window.

With this arrangement, the first window, which is larger in width, is provided only on one surface, thus increasing strength of the disk cartridge.

In the disk cartridge of the present invention, the covering boards respectively provided for the plurality of windows may have the same opening and closing direction.

With this arrangement, opening and closing operation of the covering boards can be simplified. Further, by performing the opening and closing operation of the covering boards in response to the insertion operation of the disk cartridge to the driving device, it is possible to further simplify the operation.

In the disk cartridge of the present invention, the covering boards respectively provided for the plurality of windows may be opened and closed individually.

With this arrangement, when the disk cartridge is recorded or reproduced with a small-sized driving device, it is possible to close the opening not used for the recording or reproducing with the covering board, thus preventing dust from getting in the disk cartridge.

Further, the disk cartridge of the present invention may be arranged such that the case is formed by joining a first case for covering one round-shaped surface of the recording medium and a second case for covering the other round-shaped surface of the recording medium, and the first case has the first and second windows, and the second case has only one window having the same shape as that of the second window of the first case in an area corresponding to the second window of the first case.

The optical disk device of the present invention includes an optical head, which is used for carrying out writing and/or reading of an information signal with respect to the foregoing disk cartridge.

With this arrangement, since the disk cartridge with the foregoing structure is capable of recording/reproducing for an area close to the inner radius of the recording medium, thus realizing high density information processing. Further, it becomes possible to allow a larger recording or reproducing head to make access to a small disk, thus realizing high speed processing.

The optical disk device of the present invention may use a cartridge adapter mounting the disk cartridge for recording information on the disk cartridge, or for reproducing information in the disk cartridge.

On this account, it is possible to simplify the structure of the optical disk device, and the invention can be realized by simply providing a cartridge adaptor to a conventional driving device.

It is preferable that the optical device of the present invention is a stationary optical disk device, and is arranged such that the first and second windows are both opened when information recording or reproducing of the disk cartridge, and chucking of the recording medium is carried out through the second window, and the optical head is inserted through the first window.

With this arrangement, a large optical head of a stationary optical disk driving device, which is normally used for a large-sized disk, can make access to a small-sized disk, thus realizing high speed information processing.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A disk cartridge, comprising:

a case, substantially rectangular in shape, provided with a disk-shaped rotatable recording medium therein, the case including a plurality of windows through which the recording medium is exposed and a recording or reproducing head is inserted when recording or reproducing, and shutters provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window.

2. The disk cartridge as set forth in claim 1, wherein:

the width of the first window in the opening and closing direction of the shutters is not less than ⅓ of a diameter of the recording medium.

3. The disk cartridge as set forth in claim 2, wherein:

the width of the second window in the opening and closing direction of the shutters is less than ⅓ of the diameter of the recording medium.

4. The disk cartridge as set forth in claim 2, wherein:

the first window allows insertion of a large-sized head of a first optical disk device, and the second window allows insertion of a small-sized head of a second optical disk device.

5. The disk cartridge as set forth in claim 4, wherein:

the first optical disk device is a stationary optical disk device.

6. The disk cartridge as set forth in claim 5, wherein:

the first optical disk device is mainly used for recording or reproducing of a recording medium having a diameter of 120 mm.

7. The disk cartridge as set forth in claim 4, wherein:

the second optical disk device is a portable optical disk device.

8. The disk cartridge as set forth in claim 7, wherein:

the second optical disk device is mainly used for recording or reproducing of a recording medium having a diameter of 50 mm.

9. The disk cartridge as set forth in claim 1, wherein:

when the first and second windows are opened, the shutter provided on the first window partially extends out of a width of the case, and the shutter provided on the second window is within the width of the case.

10. The disk cartridge as set forth in claim 1, wherein:

the case has a third window on an opposite surface of the surface having the first and second windows, and the third window is formed on an area corresponding to the second window.

11. The disk cartridge as set forth in claim 1, wherein:

the shutters respectively provided for the plurality of windows have the same opening and closing direction.

12. The disk cartridge as set forth in claim 1, wherein:

the shutters respectively provided for the plurality of windows are opened and closed individually.

13. The disk cartridge as set forth in claim 1, wherein:

the case is formed by joining a first half case for covering one round-shaped surface of the recording medium and a second half case for covering the other round-shaped surface of the recording medium, the first half case has the first and second windows; and the second half case has only one window having the same shape as that of the second window of the first half case in an area corresponding to the second window of the first half case.

14. The disk cartridge as set forth in claim 1, wherein:

the recording medium is an optical disk.

15. The disk cartridge as set forth in claim 1, wherein:

the recording medium has a diameter of 50 mm.

16. An optical disk device, comprising:

an optical head, the optical head used for carrying out writing and/or reading of a information signal with respect to a disk cartridge which includes a case, substantially rectangular in shape, provided with a disk-shaped rotatable recording medium therein, the case including a plurality of windows through which the recording medium is exposed and a recording or reproducing head is inserted when recording or reproducing, and covering boards provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window.

17. The optical disk device as set forth in claim 16, wherein:

the optical disk device uses a cartridge adapter mounting the disk cartridge for recording information on the disk cartridge, or for reproducing information in the disk cartridge.

18. The optical disk device as set forth in claim 16, wherein:

the optical disk device is a stationary optical disk device.

19. The optical disk device as set forth in claim 18, wherein:

the first and second windows are both opened when information recording or reproducing of the disk cartridge; chucking of the recording medium is carried out through the second window; and the optical head is inserted through the first window.

20. A method for recording and reproducing of information with respect to a disk cartridge which includes a case, substantially rectangular in shape, provided with a disk-shaped rotatable recording medium therein, the case including a plurality of windows through which the recording medium is exposed and a recording or reproducing head is inserted when recording or reproducing, and shutters provided for the plurality of windows respectively, that are capable of opening and closing so as to cover the plurality of windows when recording or reproducing is not performed, a first window and a second window of the plurality of windows being formed on one surface, and a width of the first window in an opening and closing direction of the shutters being wider than that of the second window, the method, comprising the steps of:

recording information by inserting a small-sized optical head of a portable optical disk device through the second window; and reproducing information by inserting a large-sized optical head of a stationary optical disk device through the first window.

* * * * *